(12) United States Patent
Endo et al.

(10) Patent No.: US 6,283,502 B1
(45) Date of Patent: Sep. 4, 2001

(54) AIR BAG APPARATUS FOR AUTOMOTIVE VEHICLE

(75) Inventors: Tetsuji Endo; Kazuo Yanagidaira, both of Fuji (JP)

(73) Assignee: Nihon Plast Co., Ltd. (JP)

( * ) Notice: Subject to any disclaimer, the term of this patent is extended or adjusted under 35 U.S.C. 154(b) by 0 days.

(21) Appl. No.: 09/499,917

(22) Filed: Feb. 8, 2000

(51) Int. Cl.[7] .................................................. B60R 21/16
(52) U.S. Cl. ........................................ 280/731; 280/743.1
(58) Field of Search .............................. 280/728.1, 731, 280/732, 743.1

(56) References Cited

U.S. PATENT DOCUMENTS 4,752,083 * 6/1988 Honda .................................... 280/731
5,887,892 * 3/1999 Burdack et al. ...................... 280/731
5,897,133 * 4/1999 Papandreou ....................... 280/728.2

FOREIGN PATENT DOCUMENTS 09295546   11/1997  (JP) .

\* cited by examiner

Primary Examiner—Paul N. Dickson
Assistant Examiner—Faye M. Fleming
(74) Attorney, Agent, or Firm—Kilpatrick Stockton LLP

(57) ABSTRACT

A casing is fixed to a steering wheel and has a first center line, an upper space, and a lower space. The first center line is positioned below a second center line of the steering wheel. An inflator is arranged in the casing and has a third center line. The inflator is for generating a gas. The third center line is positioned below the first center line and positioned at a boundary between the upper space and the lower space. An air bag has an upper portion accommodated in the upper space and a lower portion accommodated in the lower space. The upper portion is in an upper folding state. The lower portion is in a lower folding state. The upper folding state is looser than the lower folding state.

6 Claims, 5 Drawing Sheets

UPPER

LOWER

AIR BAG APPARATUS FOR AUTOMOTIVE VEHICLE

BACKGROUND OF THE INVENTION

1. Field of the Invention

The present invention relates to an air bag apparatus adapted for an automotive vehicle, and particularly to one which is assembled to a steering wheel.

2. Description of Relevant Art

Generally, in an air bag apparatus for an automotive vehicle, an air bag module is assembled at a central portion of a steering wheel. An air bag module accommodates a folded air bag and an inflator inside a casing. When an automotive vehicle is collided, the air bag is expanded by a gas which is generated by an inflator. The air bag pushes the cover to be broken and develops to outside. Further, the air bag receives an occupant who falls to a side of the steering wheel, thereby to protect him.

In a conventional art, as known in Japanese Patent Application Laid-open No. 9-295546, an air bag is shifted on an upper side to be developed so that an upper portion and a lower portion of the air bag can simultaneously contact with an occupant.

SUMMARY OF THE INVENTION

However, in such a conventional art, an air bag is structured such that it is shifted to an upper side to be developed, and there is possibility a lower end of a rim in a steering wheel is not covered with a lower portion of the air bag. Therefore, if only the lower end of the rim has a strength to easily transform, manufacturing a steering wheel is troublesome and is disadvantageous in view of cost.

It is an object of the invention to provide an air bag apparatus in which an air bag covers a whole steering wheel and an upper portion and a lower portion of an air bag simultaneously contact with an occupant at an early stage of development.

To achieve the object, an air bag apparatus for an automotive vehicle is provided with members as follows. A casing is fixed to a steering wheel, and has a first center line, an upper space and a lower space. The first center line is positioned below a second center line of the steering wheel. An inflator is arranged in the casing and has a third center line. The inflator is for generating a gas. The third center line is positioned below the first center line and positioned at a boundary between the upper space and the lower space. An air bag has an upper portion accommodated in the upper space and a lower portion accommodated in the lower space. The upper portion is in an upper folding state. The lower portion is in a lower folding state. The upper folding state is looser than the lower folding state.

The word, "folding state", means intervals between folds of an air bag. The word, "loose", means that the intervals are large and the word, "dense", means that the intervals are small. The word "loose" is looser than "dense".

Preferably, the upper portion has an upper volume, the lower portion has a lower volume, and the upper volume is approximately equal to the lower volume.

Preferably, the air bag apparatus further has a cover which is fixed to the casing and has a breaking portion to be broken to open by the gas from the inflator. The breaking portion is positioned above the first center line.

Preferably, the breaking portion is thinner than other portions of the cover.

Preferably, the breaking portion has a recess on an inside of the cover.

Preferably, the air bag has a fourth center, and the fourth center is positioned on or below the third center line of the inflator.

Herein, the first center line passes a geometrical center of the casing. The second center line passes a geometric center of the steering wheel and is along an axis direction of a steering shaft. The third center line passes a geometric center of the inflator. The fourth center is a geometric center of the air bag.

According to the invention, a third center line of an inflator is positioned below a first center line of a casing, and an upper space above an inflator is larger than a lower space. An upper portion is accommodated in the upper space of the casing, while a lower portion is accommodated in the lower space of the casing. An upper folding state of an upper portion is looser than a lower folding state. Therefore, the upper portion accommodated in the upper space is developed earlier than the lower portion accommodated in the lower space. Namely, a gas enters into folds with large intervals more easily than those with small intervals. Further, a gas generated by the inflator is discharged to a large upper space more than a small lower space in a closed system. Thus, in a case of accommodating an air bag in the large upper and small lower spaces, an upper portion of the air bag accommodated in the large upper space is developed earlier than a lower portion of the air bag. As a result, first contact phenomenon that the lower portion is first brought in contact with an occupant is corrected, the first contact being caused by arranging an air bag module below. If an occupant have attitude to sit significantly close to a front side, the upper and lower portions of the air bag simultaneously contact with an occupant at an early stage of development of the air bag, thereby to evenly protect a head portion and a body portion of the occupant.

Further, a breaking portion of a cover is positioned above a first center line of a casing, and an upper side cover above the breaking portion is smaller than a lower side cover. As a result, when an air bag expands in a casing to lift a cover, an opening angle of the upper side cover is larger than that of a lower side cover. Therefore, when the cover is separated into upper and lower portions, the upper side cover has already opened at a large angle with a small size, so that the upper side cover opens earlier than the lower side cover. An upper portion of the air bag early develops from the upper side cover early opened. Further, the delayed opened lower side cover guides the air bag to an upper side. As a result, first contacting a lower portion of the air bag in contact with an occupant is better corrected, and a head portion and a body portion of an occupant evenly protected.

Further, breaking portion is thin formed from inside of a cover, and it does not appear on outside of the cover, thereby being excellent in view of outward appearance.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

Figure 1:
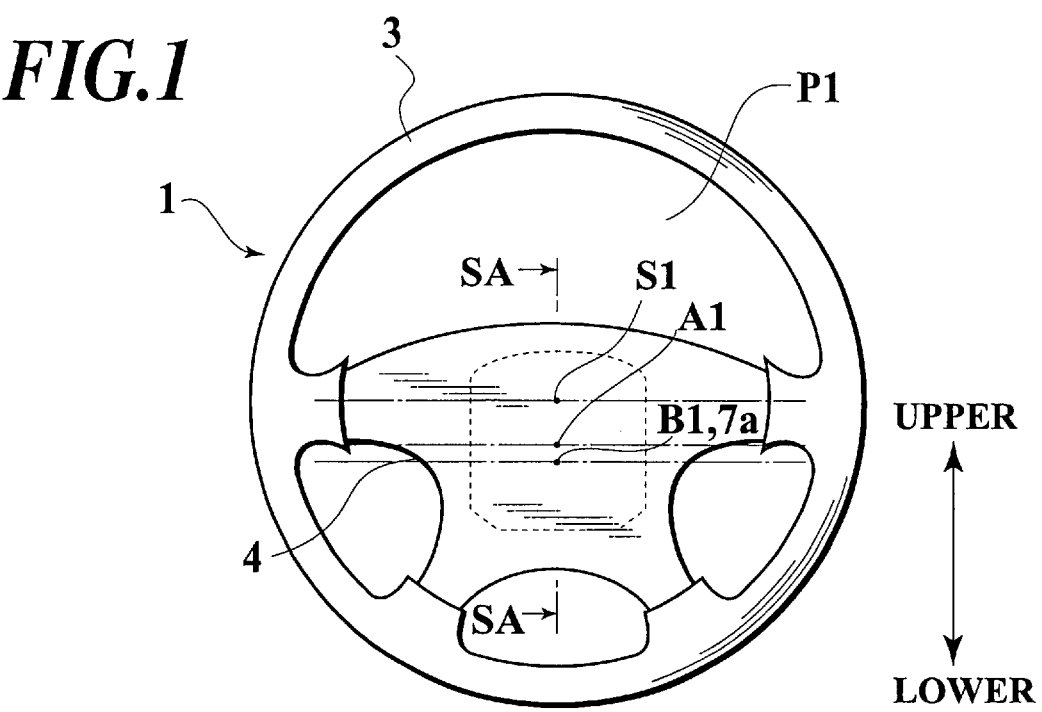
FIG. 1 is a front view of a steering wheel according to a first embodiment of the invention.
Figure 2:
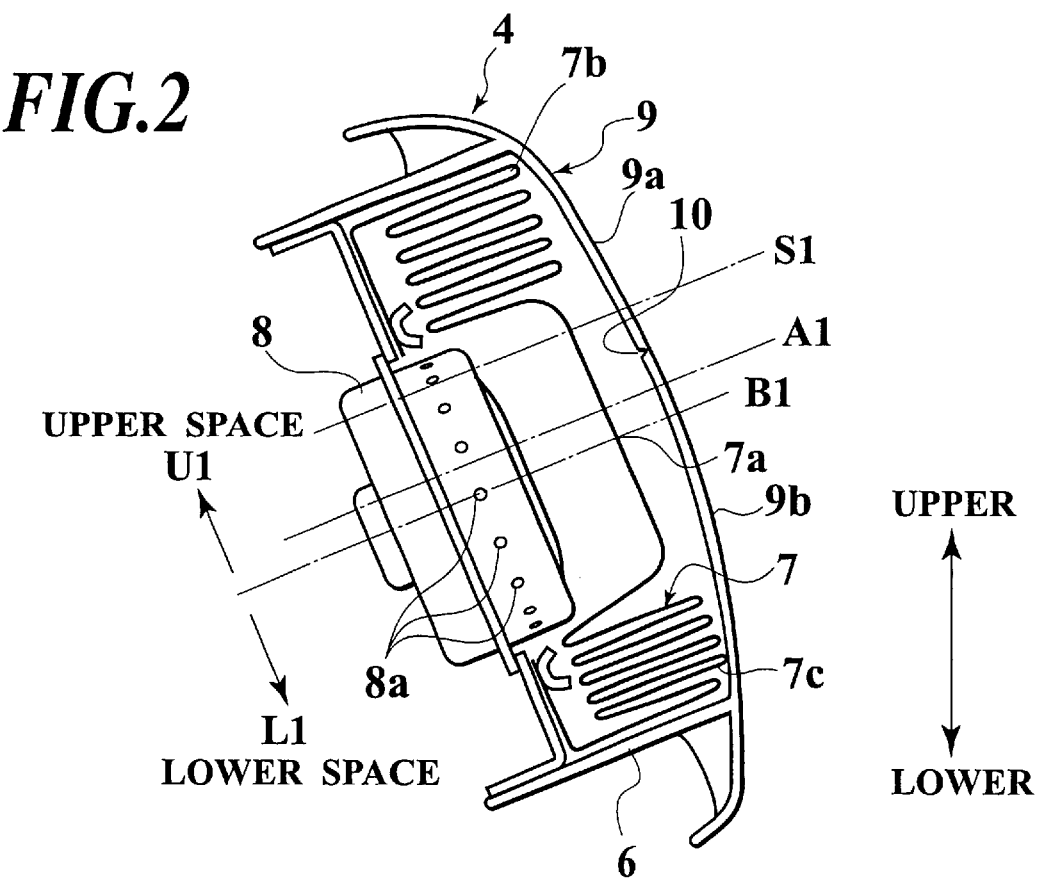
FIG. 2 is a cross-sectional view taken along the line SA—SA shown by arrows in the FIG. 1.
Figure 3:
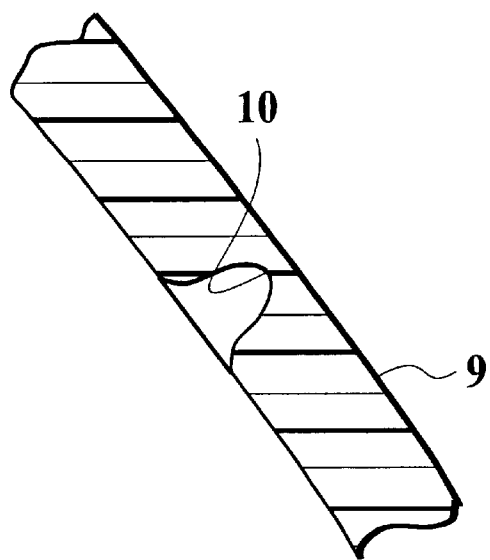
FIG. 3 is a enlarged cross-sectional view which shows a breaking portion.

A description will be given of an embodiment in accordance with the present invention with reference to FIGS. 1 to 10.

First Embodiment

Reference character 1 denotes a steering wheel, which is placed in an instrument panel 2 (refer to FIG. 5) disposed in a front portion within a vehicle cabin at a predetermined angle θ. A rim 3 for operating a handle is provided in a periphery of the steering wheel 1, and an air bag module 4 is provided in a center portion of the steering wheel 1.

A center line A1 of the air bag module 4 is arranged below a center line S1, or a second center line, of the steering wheel 1 which passes a center of the rim 3. This structure is made for forming a little great gap PI between the air bag module 4 and the upper rim 3 by arranging the air bag module 4 in a lower portion, thereby capable of viewing a meter 5 (refer to FIG. 5) placed on the instrument panel 2 from the gap P1:

The air bag module 4 is particularly structured such as to accommodate an air bag 7 and an inflator 8 within a synthetic resin casing 6, and a center line A1, a first center line, of the casing 6 (a center of a volume of the casing 6) corresponding to a center line of the air bag module 4 is positioned below the center line S1 of the steering wheel 1. The casing 6 has a plain configuration in a rectangular shape. A surface of the casing 6 is formed by a cover 9, and a line-shaped breaking portion 10 is thin formed on the cover 9 from a back surface side along a horizontal direction (refer to FIG. 3). A position at which the breaking portion 10 is provided is arranged above the center line A1 of the casing 6. The cover 9 on the surface of the casing 6 can be separated into upper and lower portions 9a, 9b by being broken to open from the breaking portion 10 in the case of being applied a great force from an inner side. Further, since the breaking portion 10 is thin formed from the back surface side of the cover 9, it does not generally appear to the surface side of the cover 9, so that it is preferable in view of outward appearance.

Since a plurality of gas discharging holes 8a are formed on a side surface of the inflator 8, it is possible to expand the air bag 7 by the gas discharged therefrom. A center line B1, or a third center line, of the inflator 8 is also on a center of gas discharging, and the center line B1 is positioned below the center line A1 of the casing 6. Further, the air bag 7 is accommodated within the casing 6 in a folded state, however, a center 7a of the air bag 7 is also aligned with the center line B1 of the inflator 8. The center 7a corresponds to a geometric center with respect to a developed air bag 7. Accordingly, when setting a space above the center line B1 of the inflator 8 to an upper space U1 and a space below the center line B1 to a lower space L1 among a space within the casing 6, the air bag 7 is evenly accommodated in the upper space U1 and the lower space L1, and volumes of the upper and lower spaces become equal to each other. For example, in FIG. 2, five "folds" of the air bag 7 are respectively accommodated in the upper space U1 and the lower space L1 of the casing 6 in the same manner. Accordingly, as a accommodating state of the air bag 7, the upper space U1 is "loose" and the lower space L1 is "dense". In this "loose" state, the gas from the inflator 8 easily enters between the respective folds so as to promote development of the air bag 7.

Next, a description will be given of an operation when developing the air bag 7. When an automotive vehicle is collided, a signal is transmitted from a sensor (not shown) to the inflator 8 and a gas is discharged from the inflator 8. The air bag 7 expands within the casing 6 due to the gas from the inflator 8 so as to lift up the cover 9 of the casing 6. The cover 9 is broken to open from the breaking portion 10 after being lifted up at a certain degree, whereby the cover 9 is separated into upper and lower portions 9a, 9b. The air bag 7 is developed to a side of an occupant M1 from a portion between the vertically separated cover 9 at a moment and receives and protects the occupant M1 who falls forward (refer to FIG. 5). At this time, all of the rim 3 of the steering wheel 1 is covered with the developed air bag 7 and accordingly no part of a body of the occupant M1 is directly brought into contact with the rim 3.

Further, an upper portion 7b and a lower portion 7c of the air bag 7 is simultaneously brought into contact with the occupant M1 from an early stage of the development of the air bag 7 and can evenly protect a head portion and a body portion of the occupant M1. Since this vertically even protection mentioned above is performed from the early stage of the development of the air bag 7, it can be obtained in the same manner even in an attitude that the occupant M1 sits significantly close to the front side (the side of the steering wheel 1).

This vertically even protection mentioned above can be obtained by positioning the center line B1 of the inflator 8 below the center line A1 of the casing 6 and evenly accommodating the air bag 7 in the upper space U1 and the lower space L1 within the casing 6. Further, this can be also achieved by positioning the breaking portion 10 above the center line A1 of the casing 6.

The upper space U1 becomes larger than the lower space L1 by positioning the center line B1 of the inflator 8 below the center line A1 of the casing 6, however, the air bag 7 itself is accommodated so as to exist in the upper space U1 and the lower space L1 at the same volume. Accordingly, the upper portion 7b of the air bag 7 accommodated within the upper space U1 develops earlier than the lower portion 7c of the air bag 7 which is accommodated within the lower space L1. That is, since the gas generated from the inflator 8 is discharged to a large space more than a small space in a closed system, the upper portion 7b accommodated in the large space develops earlier in the case that the same volume of air bag 7 is accommodated in the large space and the small space. Accordingly, it is possible to correct a first contact phenomenon that the lower portion 7c of the air bag 7 is first brought into contact with the occupant M1 caused by arranging the air bag module 4 in a lower portion. Therefore, as mentioned above, the upper portion 7b and the lower portion 7c of the air bag 7 are simultaneously brought into contact with the occupant M1 and can evenly protect the head portion and the body portion of the occupant M1.

Figure 4:
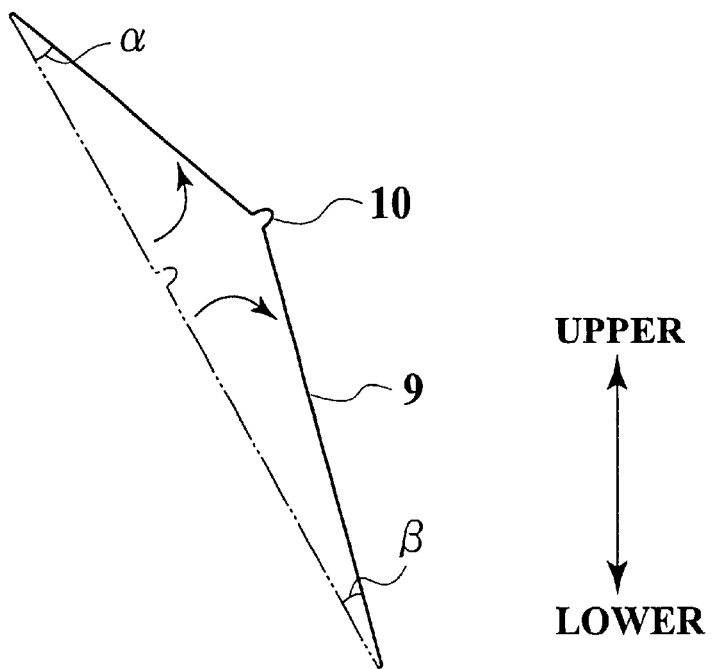
FIG. 4 is a view which shows each opening angle of an upper cover and a lower cover when a cover is lifted.
Figure 5:
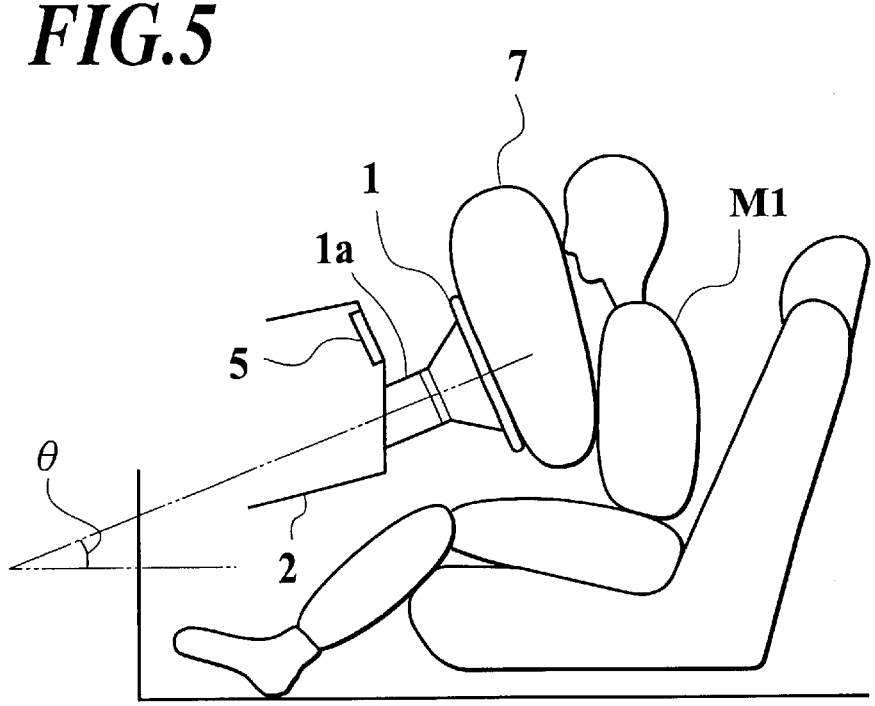
FIG. 5 is a side view which shows a state where an upper portion and a lower portion of an air bag simultaneously contact with an occupant.

Further, by positioning the breaking portion 10 of the cover 9 above the center line A1 of the casing 6, as shown in FIG. 4, the portion above the breaking portion 10 in the cover 9 becomes smaller than the lower side. Accordingly, in the case that the air bag 7 expands within the casing 6 and the cover 9 is lifted up, an upper opening angle α becomes greater than a lower opening angle β. Therefore, in the case that the cover 9 is separated into the upper and lower portions 9a, 9b from the breaking portion 10, the upper portion 9a has been already opened at a great angle α and a size thereof is small, so that the upper portion 9a is earlier opened than the lower portion 9b. The upper portion 7b of the air bag 7 is earlier developed from the earlier opened upper side of the cover 9. Further, the delayed opened lower side of the cover 9 serves as a guide for introducing the air bag 7 to the upper side. Accordingly, the first contact phenomenon that the lower portion 7c of the air bag 7 is first brought into contact with the occupant M1 can be better corrected, and the head portion and the body portion of the occupant M1 are evenly protected.

The center line B1 of the inflator 8 may be positioned below the center line A1 of the casing 6 such that a ratio of the upper space U1 to the lower space L1 is from 6:4 to 7:3.

Second Embodiment

Figure 6:
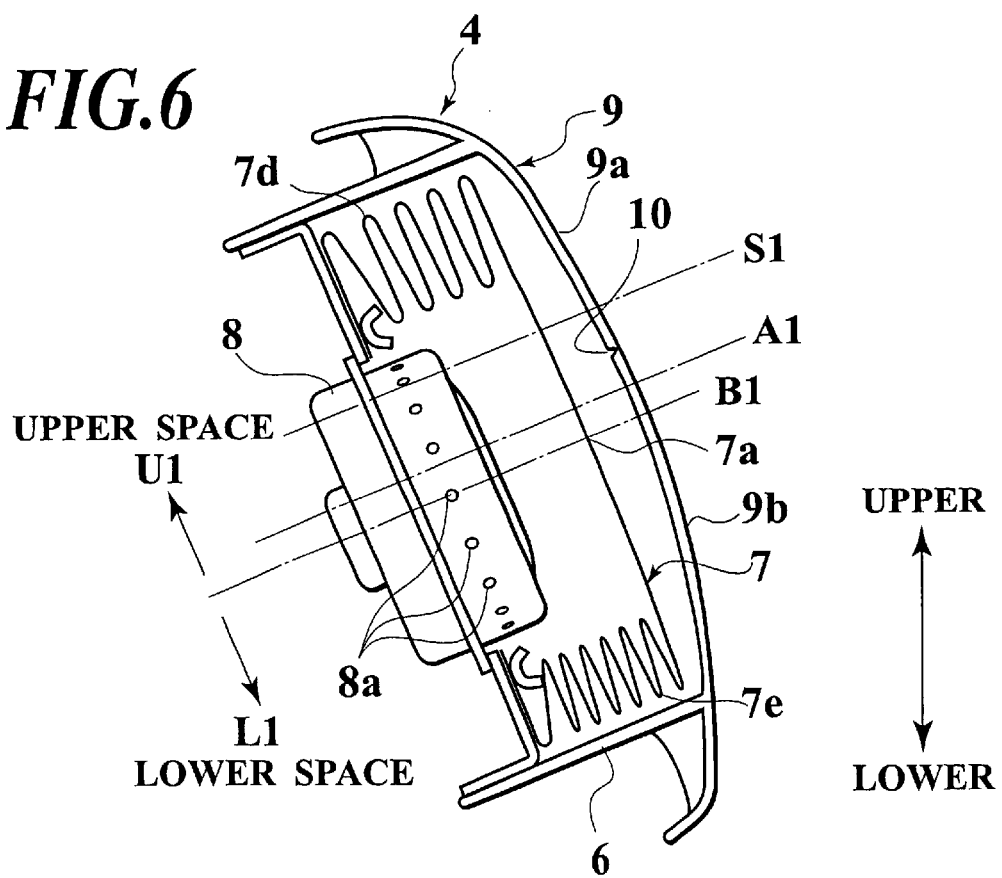
FIG. 6 is a cross-sectional view of an air bag module of a second embodiment.

As shown in FIG. 6, an air bag module in accordance with a second embodiment is characterized in that an upper portion 7d and a lower portion 7e of the air bag 7 are folded in an axial direction of the steering wheel 1. A center 7a of the air bag 7 is align with, or, a center line B1 of an inflator 8. The upper portion 7d with a volume in the air bag 7 is accommodated in the upper space U1, and in the lower space L1 there is accommodated the lower portion 7e with the same volume as that f the upper portion 7d. The upper portion 7d of the air bag 7 has four "folds" in an inner side thereof, the lower portion 7e of the air bag 7 has six "folds", and intervals between the respective folds in the upper portion 7d is set to be larger than those in the lower portion 7e. Accordingly, with respect to a "folding state" of the air bag 7, the upper portion 7d of the upper space U1 is "loose" and the lower portion 7e of the lower space L1 is "dense". Therefore, the same effect as that of the first embodiment can be obtained.

Further, even in the case that the upper portion 7d and the lower portion 7e of the air bag 7 are accommodated in the respective spaces U1 and L1 at an equal volume, since a length of the folds in the upper portion 7d is greater than that in the lower portion 7e, a number of the folds in the upper portion 7d becomes smaller than that in the lower portion 7e, so that intervals between the respective folds in the upper portion 7d is set to be greater than those in the lower portion 7e. That is, the upper portion 7d becomes "loose" and the lower portion 7e becomes "dense".

Further, when the "folding state" of the upper portion 7d is "loose" and that of the lower portion 7e is "dense", the volume of the upper portion 7d may be greater than that of the lower portion 7e.

While preferred embodiments of the present invention have been described using specific terms, such description is for illustrative purposes, and it is to be understood that changes and variations may be made without departing from the spirit or scope of the following claims.

Third Embodiment

Figures 7, 8:
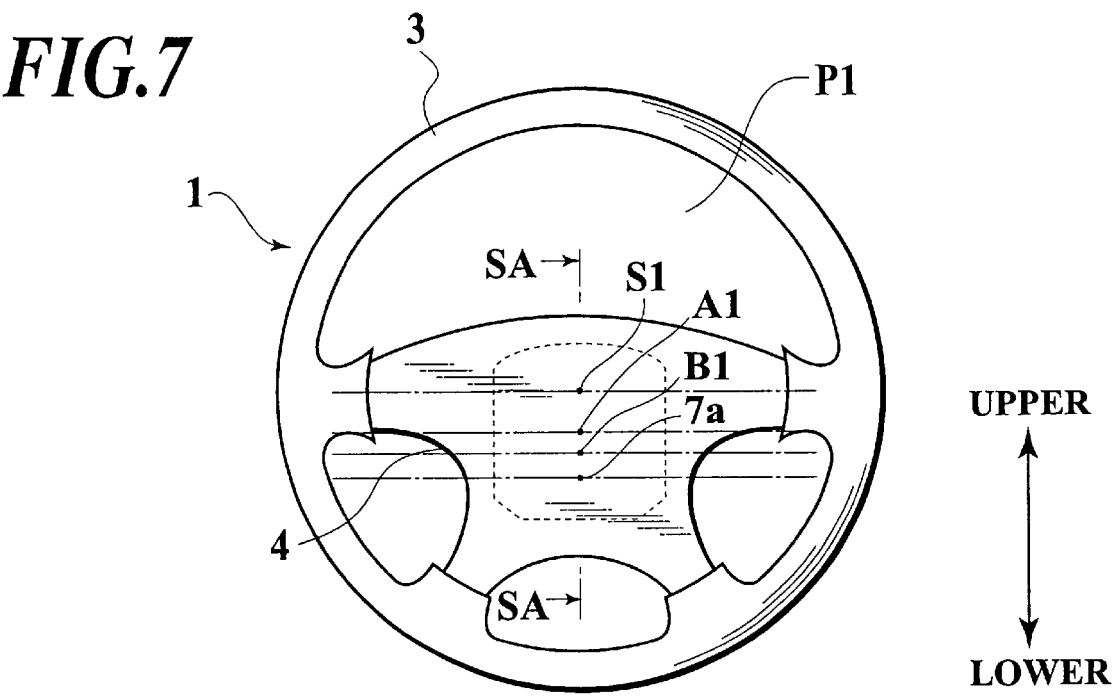
FIG. 7 is a front view of a steering wheel according to a third embodiment of the invention.
FIG. 8 is a cross-sectional view taken along the line SA—SA shown by arrows in the FIG. 7.

As shown in FIGS. 7 and 8, an air bag module according to a third embodiment is substantially similar to the first embodiment. A feature of this embodiment is that a volume of an upper portion 7f in an air bag 7 is smaller than that of a lower portion 7g. Namely, a center 7a of the air bag 7 is positioned below a center line B1 of an inflator 8.

A method of accommodating the air bag 7 is explained. First, as shown by a dotted line in FIG. 8, a center 7a' of an air bag 7' is set below the center line B1 of the inflator 8. Secondly, the upper portion 7f is accommodated in an upper space U1 while being folded, thus forming four "folds". On the other hand, a lower portion 7g is accommodated in a lower space L1, thus forming six "folds".

According to this embodiment, "folding state" of the upper portion 7f of the air bag 7 is looser than that of the upper portion 7b of the first embodiment. Therefore, gas from the inflator 8 further easily enters between the respective folds.

Fourth Embodiment

Figure 9:
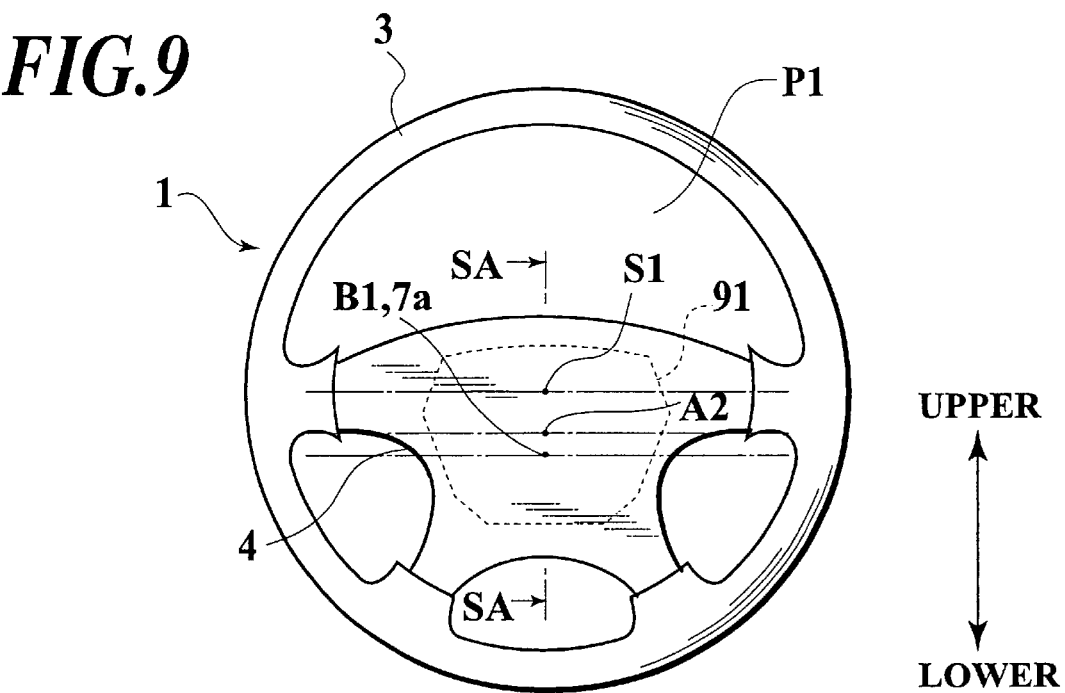
FIG. 9 is a front view of a steering wheel according to a fourth embodiment.

As shown in FIG. 9, a fourth embodiment is substantially similar to the first embodiment. A feature is that a casing 91 has a plain configuration in an inverse trapezoid shape. A center line A2 is positioned above the center line A1 of the casing 9.

According to the embodiment, since an upper space of the casing 91 is set greater than a lower space, folding state of an upper portion of an air bag 7 is "loose" and one of a lower portion is "dense". Therefore, this embodiment obtains the same benefit as the first embodiment.

When the casing 91 accommodates the air bag 7, if an upper portion of the air bag 7 is accommodated looser than a lower portion thereof, a center 7a of the air bag 7 may be align with a center line B1 of an inflator 8 or the center 7a may be positioned above the center line B1, thus to easily adjust development speed of the air bag 7.

Fifth Embodiment

Figure 10:
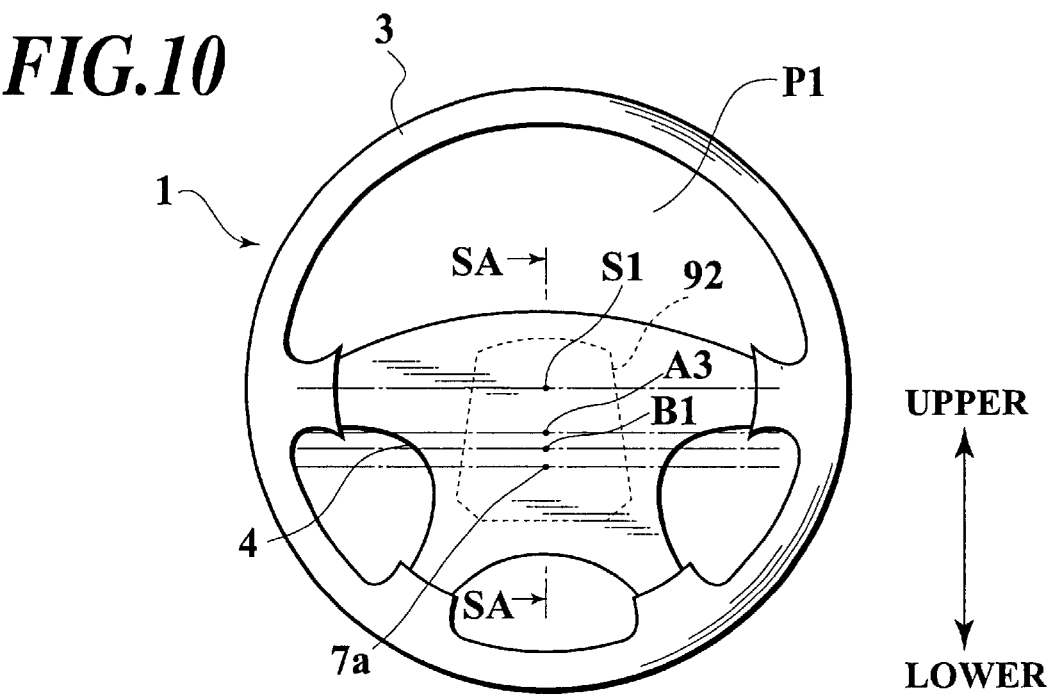
FIG. 10 is a front view of a steering wheel according to a fifth embodiment.

As shown in FIG. 10, a fifth embodiment is substantially similar to the third embodiment. A feature is that a casing 92 has a plain configuration in a trapezoid shape. A center line A3 of the casing 92 is positioned below the center line A1 of the casing 9.

According to the embodiment, since an upper space of the casing 92 is set greater than a lower space, folding state of an upper portion of an air bag 7 is "loose" and one of a lower portion is "dense". Therefore, this embodiment obtains the same benefit as the third embodiment.

When the casing 92 accommodates the air bag 7, a distance between a center line B1 of an inflator 8 and a center 7a of the air bag 7 below the center line B1 may be modified, thus to easily adjust development speed of the air bag 7.

What is claimed is:

1. An air bag system for an automotive vehicle comprising:

a steering wheel with a second center line;

a casing fixed to the steering wheel, the casing having a first center line, a first space, and a second space, the first center line being positioned remotely from the second center line in a radial direction of the steeling wheel, the second space being further from the second center line in the radial direction than the first space;

an inflator arranged in the casing and having a third center line, the third center line being positioned further from the second center line in the radial direction than the first center line and positioned at a boundary between the first space and the second space; and an air bag having a first portion accommodated in the first space and a second portion accommodated in the second space, the first portion being in a first folding state, the second portion being in a second folding state, the first folding state being looser than the second folding state, so that on operation of the inflator the first portion is expanded earlier than the second portion, whereby the upper and lower portion substantially simultaneously first contact an occupant of the vehicle.

2. An air bag system for an automotive vehicle according to claim 1, wherein the first portion has a first volume, the second portion has a second volume, and the first volume is approximately equal to the second volume.

3. An air bag system for an automotive vehicle according to claim 1, further comprising:

a cover fixed to the casing, the cover having a break portion to be broken to open by the gas from the inflator, the break portion being positioned closer to the second line in the radial direction than the first center line.

4. An air bag apparatus for an automotive vehicle according to claim 3, wherein the breaking portion is thinner than other portions of the cover.

5. An air bag apparatus for an automotive vehicle according to claim 4, wherein the breaking portion has a recess on an inside of the cover.

6. An air bag system for an automotive vehicle according to claim 1, wherein the air bag has a fourth center, and the fourth center is positioned on the third center line or further from the second center line in the radial direction than the third center line.

* * * * *